United States Patent [19]
Tokunaga et al.

[11] Patent Number: 5,035,966
[45] Date of Patent: Jul. 30, 1991

[54] SEALED LEAD-ACID BATTERY

[75] Inventors: Akio Tokunaga; Toshiaki Hayashi, both of Kyoto, Japan

[73] Assignee: Japan Storage Battery Co., Ltd., Kyoto, Japan

[21] Appl. No.: 447,938

[22] Filed: Dec. 8, 1989

[30] Foreign Application Priority Data

Dec. 9, 1988 [JP] Japan ................... 63-312181
Dec. 9, 1988 [JP] Japan ................... 63-312182
Dec. 20, 1988 [JP] Japan ................... 63-321124

[51] Int. Cl.⁵ .......................................... H01M 2/14
[52] U.S. Cl. ............................. 429/130; 429/135; 429/204; 429/225
[58] Field of Search ............... 429/132, 131, 130, 144, 429/190, 204, 134, 135

[56] References Cited

U.S. PATENT DOCUMENTS

| | | | |
|---|---|---|---|
| 1,405,627 | 2/1922 | Petrie | 429/132 |
| 1,433,136 | 10/1922 | Holmes | 429/132 |
| 1,486,430 | 3/1924 | Hansen | 429/132 |
| 1,541,377 | 6/1925 | Owen | 429/130 |
| 1,573,369 | 2/1926 | Benner | 429/252 |
| 2,655,552 | 10/1953 | Fuller et al. | 429/144 |
| 2,892,247 | 6/1959 | Honey | |
| 2,923,758 | 2/1960 | Lake | |
| 4,262,068 | 4/1981 | Kono et al. | |
| 4,652,505 | 3/1987 | Komaki et al. | 429/131 |

FOREIGN PATENT DOCUMENTS

| | | |
|---|---|---|
| 440102 | 1/1941 | Belgium . |
| 0253987 | 5/1987 | European Pat. Off. . |
| 2054994 | 11/1971 | Fed. Rep. of Germany . |
| 385707 | 8/1908 | France . |
| 57119405 | 1/1984 | Japan . |
| 60277145 | 6/1987 | Japan . |
| 272916 | 9/1928 | United Kingdom . |
| 0777270 | 6/1957 | United Kingdom ............ 429/132 |
| 787872 | 12/1975 | United Kingdom . |

Primary Examiner—Anthony Skapars
Attorney, Agent, or Firm—Sughrue, Mion, Zinn, Macpeak & Seas

[57] ABSTRACT

A sealed lead-acid battery is provided containing a sulfuric acid electrolyte of a sufficient amount to perform charging and discharging of the battery which is impregnated and retained in fine particles of silica located and placed around an assembled element. In this way, an inexpensive sealed-lead acid battery which exhibits high discharging performance.

13 Claims, 1 Drawing Sheet

SEALED LEAD-ACID BATTERY

BACKGROUND OF THE INVENTION

The present invention relates to an improvement in sealed lead-acid batteries.

Sealed lead-acid batteries in which oxygen gas generated at the positive electrode during charging of the battery is absorbed by the negative electrode are available in two types, a retainer type and a gel type. In batteries of a retainer type, a separator (glass separator) in mat form which is made of fine glass fibers is inserted between the positive and negative plates so as to isolate the two electrodes and to retain the sulfuric acid electrolyte necessary to perform discharging. These types of batteries have recently come to be used with portable equipment and as backup power supplies for computers. However, the disadvantages of batteries of a retainer type are the high cost of the glass separator and their inability to retain an adequate amount of electrolyte, which renders it unavoidable that the discharge capacity is limited by the quantity of electrolyte when low-rate discharge is effected. Because of these shortcomings, the commercial use of sealed lead-acid batteries of a retainer type has been considerably limited.

Gel type sealed lead-acid batteries are less expensive than batteries of a retainer type, but their performance is inferior to the latter.

SUMMARY OF THE INVENTION

An object of the present invention is to provide an inexpensive sealed lead-acid battery that is free from the above-described problems of the prior art and which yet exhibits high discharging performance. The object of the present invention is achieved by providing a sulfuric acid electrolyte of a sufficient amount to perform charging and discharging of the battery which is impregnated and retained in the fine particles of silica loaded and placed around the assembled element.

DETAILED DESCRIPTION OF THE PREFERRED EMBODIMENTS

The present invention is described hereinafter by means of examples.

EXAMPLE 1

Figure 1:
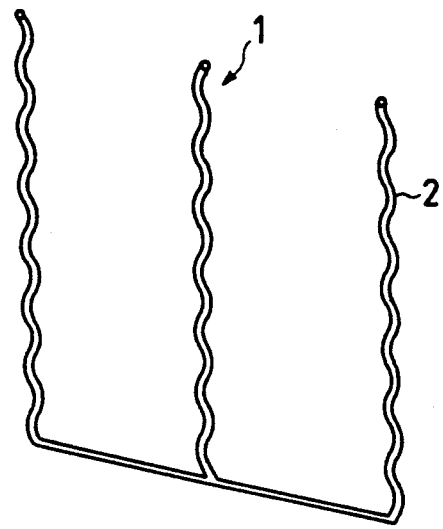
FIG. 1 is a perspective view of a spacer bar.
Figure 2:
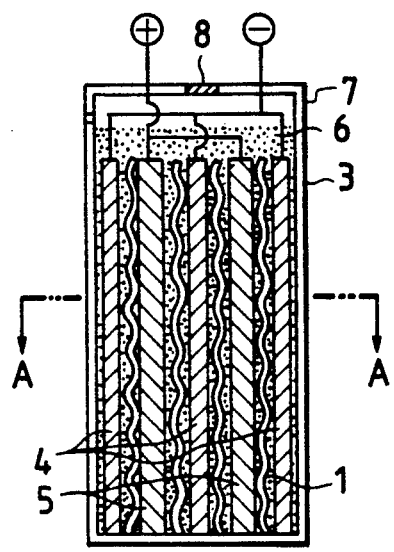
FIG. 2 is a front view showing the basic construction of the sealed lead-acid battery of the present invention.
Figure 3:
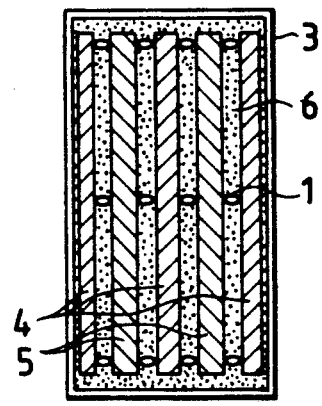
FIG. 3 is a s cross section of FIG. 2 taken on line A—A.

A positive and a negative grid made of a Pb-Ca-Sn alloy were loaded with the paste of ordinary positive and negative active materials, respectively. The paste was then cured to make unformed electrode plates. A spacer bar of the shape shown in FIG. 1 was inserted between these unformed positive and negative plates to fabricate an assembled element. The spacer bar indicated by 1 in FIG. 1 was made of an acid-resistant synthetic resin and shaped in an E form. As shown, each arm of the bar had corrugations 2 in the vertical direction. FIG. 2 is a front view of the assembled element inserted into a container, and FIG. 3 is a cross section of FIG. 2 taken on line A—A, in which numerals 3, 4 and 5 represent the container, the negative plate and the positive plate, respectively.

After inserting the assembled element into the container, an electrolyte retainer was loaded in the gaps between the container and each plate, and between the two plates. The electrolyte retainer was a bulky powder comprising fine silica particles having a primary particle size of 10–40 millimicrons that agglomerated to form secondary or tertiary particles. This powder had a large specific surface area and a great ability to absorb the sulfuric acid electrolyte. When sodium silicate is reacted with sulfuric acid, this powder can readily be obtained as hydrous silicon dioxide by the following reaction:

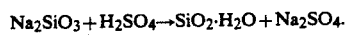

$$Na_2SiO_3 + H_2SO_4 \rightarrow SiO_2 \cdot H_2O + Na_2SO_4.$$

This is an inexpensive industrial material that is mass-produced as a rubber reinforcing agent. The powder composed of this hydrous silicon dioxide is hereinafter referred to as a fine particulate silica.

The battery filled with this particulate fine silica 6 is shown in FIGS. 2 and 3. The loading of the fine particular silica was effected with vibrations being applied to the battery. As shown, the fine silica particles were tightly packed around the assembled element and between the electrode plates. The fine particulate silica also served as a separator. After loading the fine particulate silica, the container was closed with a cover 7 and equipped with a vent valve 8. The loaded fine particulate silica had a porosity of about 85%.

EXAMPLE 2

The fine particulate of silica was mixed with an aqueous solution containing 15 wt % of methyl methacrylate as a binder and the mixture was granulated to particles of a size of 100–200 microns and dried. The granulated silica was a loose powder having a porosity of 90% or more and was much easier to load into the container than the ungranulated powder used in Example 1.

EXAMPLE 3

A battery was fabricated by repeating the procedure of Example 2 except that water glass having a sodium silicate concentration of 3.2 wt % was used as a binder. The granulated particles also had a size between 100 and 200 microns.

The battery thus fabricated had a nominal capacity of 4.5 Ah. After filling this battery with sulfuric acid (1.24 specific gravity) to impregnate the electrolyte retainer, initial charging was performed. After the charging, the specific gravity of the electrolyte rose to about 1.30 in the absence of free liquid electrolyte.

A capacity test was conducted on the batteries fabricated in Examples 1-3 and on two comparative samples, a retainer type and a gel type, that employed positive and negative plates in the same lot. The test results are shown in Table 1 below.

TABLE 1

| Battery | 5 hR capacity | 30 A discharge (at −15°C.) | |
|---|---|---|---|
| | | Capacity | 5 sec voltage (V) |
| Example 1 | 5 h and 29 min | 1 min and 45 sec | 1.55 |
| Example 2 | 5 h and 31 min | 1 min and 42 sec | 1.55 |
| Example 3 | 5 h and 30 min | 1 min and 46 sec | 1.56 |
| Retainer type | 4 h and 50 min | 1 min and 24 sec | 1.58 |

TABLE 1-continued

| Battery | 5 hR capacity | 30 A discharge (at −15°C.) | |
|---|---|---|---|
| | | Capacity | 5 sec voltage (V) |
| Gel Type | 4 h and 57 min | 1 min and 15 sec | 1.23 |

The retainer type battery using an electrolyte having a somewhat high specific gravity was better than the gel type (electrolyte's specific gravity =1.28) in high-rate discharge performance. On the other hand, the gel type had a slightly higher low-rate discharge capacity since it used more electrolyte. Compared with these prior art versions, the sealed lead-acid batteries of the present invention were improved by 10–20% in terms of both low- and high-rate discharge performance. This was due to the synergism of the following effects: the specific gravity of the electrolyte was somewhat higher than in the gel type; more electrolyte could be impregnated than in the retainer type; there was no need to use a separator that would resist discharging; and the acid diffused more rapidly.

EXAMPLE 4

The unformed positive and negative plates used in this example were the same as those employed in Examples 1–3. Using these plates and a glass separator made of fine (0.5–1 micron) glass fibers having a sufficiently high porosity and specific surface area, an assembled element was formed and inserted into a container. Subsequently, fine silica particles were loaded around the assembled element and on top of it so as to fabricate a battery.

EXAMPLE 5

A battery was fabricated as in Example 4 except that the fine particulate silica was replaced by a granulated silica powder that was formed using methyl methacrylate as a binder as in Example 2.

EXAMPLE 6

A battery was fabricated as in Example 4 except that the fine particulate silica was replaced by a granulated silica powder that was formed using water glass as a binder as in Example 3.

The batteries fabricated in Examples 4–6 were subjected to a capacity test and the results are shown in Table 2 below.

TABLE 2

| Battery | 5 Ah capacity | 30 A discharge (at −15° C.) | |
|---|---|---|---|
| | | Capacity | 5 sec voltage (v) |
| Example 4 | 5 h and 39 min | 1 min and 45 sec | 1.59 |
| Example 5 | 5 h and 37 min | 1 min and 45 sec | 1.58 |
| Example 6 | 5 h and 38 min | 1 min and 47 sec | 1.58 |
| Retainer type | 4 h and 50 min | 1 min and 24 sec | 1.58 |
| Gel type | 4 h and 57 min | 1 min and 15 sec | 1.23 |

The data was substantially the same as that shown in Table 1 except that the batteries fabricated in Examples 4–6 had better performance than those of Examples 1–3 in terms of both 5 hR capacity and 30 A discharge at −15° C. This was because the sulfuric acid electrolyte that could be retained in the silica powder placed around the assembled element and on top of it enabled more satisfactory supply of the electrolyte.

EXAMPLE 7

After loading a positive and a negative grid with the paste of ordinary positive and negative active materials, a glass separator 0.1 mm thick made of fine glass fibers having a diameter of 0.5–1.0 micron was attached to both sides of each electrode plate. The plates were then cured and an assembled element containing three positive plates and four negative plates was constructed using a low-resistance synthetic separator with a thickness of 0.5 mm. The assembled element was inserted into a container and a fine particulate silica was loaded between the positive and negative plates and around the assembled element.

EXAMPLE 8

A battery was fabricated as in Example 7 except that the fine particulate silica was replaced by a granulated powder prepared using methyl methacrylate as a binder.

EXAMPLE 9

A battery was fabricated as in Example 7 except that the fine particulate silica was replaced by a granulated powder prepared using water glass as a binder.

The batteries fabricated in Examples 7–9 were subjected to a capacity test and the results are shown in Table 3 below.

TABLE 3

| Battery | 5 hR capacity | 30 A Discharge (at −15° C.) | |
|---|---|---|---|
| | | capacity | 5 sec voltage (V) |
| Example 7 | 5 h and 36 min | 1 min and 42 sec | 1.53 |
| Example 8 | 5 h and 35 min | 1 min and 46 sec | 1.53 |
| Example 9 | 5 h and 38 min | 1 min and 47 sec | 1.54 |
| Retainer type | 4 h and 50 min | 1 min and 24 sec | 1.58 |
| Gel type | 4 h and 57 min | 1 min and 15 sec | 1.23 |

The batteries of Examples 7–9 were also superior in discharging performance over the prior art versions.

As is clear from Examples 1–9, the sealed lead-acid battery of the present invention adopts a simple construction in which a granulation of fine silica particles is loaded into the battery in order to retain the electrolyte and to separate the positive and negative plates. The battery of the present invention offers great industrial advantages in that the discharging performance is significantly improved over the existing sealed lead-acid batteries and that it can be fabricated at a lower cost.

We claim:

1. In a sealed lead-acid battery comprising positive plates and negative plates housed in a container, the improvement comprising:

an element having a spacer bar of synthetic resin with a given thickness inserted between said positive plate and said negative plate, said spacer bar being shaped in the form of an E and having a plurality of arms containing vertical corrugations;

fine particles of hydrous silica dioxide placed in a gap between said positive and negative plates and around said element, said fine particles of hydrous silica dioxide having primary particles of a size of 10–40 millimicrons which agglomerate to form secondary or tertiary particles; and a sulfuric acid electrolyte impregnated and retained in said loaded silica particles to perform discharging.

2. The sealed lead-acid battery of claim 1, wherein said fine particles of hydrous silica dioxide are mixed with a binder before being loaded and placed in said gap, and a resulting mixture is granulated into particles having a size of 100-200 microns for placement in said gap.

3. The sealed lead-acid battery of claim 2, wherein said binder comprises an aqueous solution containing methyl methacrylate.

4. The sealed lead-acid battery of claim 2, wherein said binder is water glass.

5. A sealed lead-acid battery wherein an element comprising positive plates, negative plates and glass separators made of fine glass fibers having high porosity and a predetermined surface area is forcefully compressed in a container, and fine particles of hydrous silica dioxide are loaded and placed in a gap between said positive and negative plates and around said element, and a sulfuric acid electrolyte is impregnated and retained in said hydrous silica dioxide particles to perform discharging, said fine particles of hydrous silica dioxide having primary particles of a size of 10-40 milimicrons which agglomerate to form secondary and tertiary particles.

6. The sealed lead-acid battery of claim 5, wherein said fine particles of hydrous silica dioxide are mixed with a binder before being loaded and placed in said gap, and a resulting mixture is granulated into particles having a size of 100-200 microns for placement in said gap.

7. The sealed lead-acid battery of claim 5, wherein said binder comprises an aqueous solution containing methyl methacrylate.

8. The sealed lead-acid battery of claim 5, wherein said binder is water glass.

9. The sealed lead-acid battery of claim 5, wherein said glass separator is made of glass fibers between 0.5 and 1.0 micron in size.

10. A sealed lead-acid battery wherein an element comprising low-resistance separators, positive plates, negative plates, and thin glass separators made of fine glass fibers is attached to both sides of each of said positive and negative plates and said element is housed in a container, and fine particles of hydrous silica dioxide are loaded and placed between said positive and negative plates and around said element, and an electrolyte is impregnated and retained in said fine particles of hydrous silica dioxide to perform discharging, wherein said thin glass separator is 0.1 mm thick and has a diameter of 0.5-1.0 microns and said fine particles of hydrous silica dioxide have primary particles of a size of 10-40 milimicrons which agglomerate to form secondary tertiary particles.

11. The sealed lead-acid battery of claim 10, wherein said fine particles of silica are mixed with a binder before being loaded and placed in said gap, and a resulting mixture is granulated into particles having a size of 100-200 microns for placement in said gap.

12. The sealed lead-acid battery of claim 11, wherein said binder comprises an aqueous solution containing methyl methacrylate.

13. The sealed lead-acid battery of claim 11, wherein said binder is water glass.

* * * * *